(12) United States Patent
Nishikawa et al.

(10) Patent No.: US 9,847,663 B2
(45) Date of Patent: Dec. 19, 2017

(54) SECONDARY-BATTERY CHARGING SYSTEM AND METHOD AND BATTERY PACK

(71) Applicant: SANYO Electric Co., Ltd., Osaka (JP)

(72) Inventors: Yukio Nishikawa, Osaka (JP); Tatsuya Ishibashi, Osaka (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 151 days.

(21) Appl. No.: 14/775,700

(22) PCT Filed: Mar. 13, 2014

(86) PCT No.: PCT/JP2014/001433
§ 371 (c)(1),
(2) Date: Sep. 13, 2015

(87) PCT Pub. No.: WO2014/148018
PCT Pub. Date: Sep. 25, 2014

(65) Prior Publication Data
US 2016/0028255 A1 Jan. 28, 2016

(30) Foreign Application Priority Data
Mar. 19, 2013 (JP) .................................. 2013-056954

(51) Int. Cl.
*H02J 7/04* (2006.01)
*H02J 7/16* (2006.01)
(Continued)

(52) U.S. Cl.
CPC ......... *H02J 7/007* (2013.01); *H01M 10/0525* (2013.01); *H01M 10/44* (2013.01);
(Continued)

(58) Field of Classification Search
CPC ........... B60W 10/26; B60W 2510/244; B60W 20/13; B60W 2710/244; H02J 2007/0037
(Continued)

(56) References Cited

U.S. PATENT DOCUMENTS 5,391,974 A * 2/1995 Shiojima ............... H02J 7/0091
320/150
2008/0224667 A1 9/2008 Tanaka et al.
(Continued)

FOREIGN PATENT DOCUMENTS

JP 7-115733 5/1995
JP 2003-087991 3/2003
(Continued)

OTHER PUBLICATIONS

International Search Report of PCT application No. PCT/JP2014/001433 dated Apr. 28, 2014.

*Primary Examiner* — Nghia Doan
(74) *Attorney, Agent, or Firm* — McDermott Will & Emery LLP (57) ABSTRACT

A charging system includes battery pack and charger. During the charge of secondary battery, charge control unit controls charger so that the charger performs constant-current charge at a first charge current, and, when at least one of the following conditions is satisfied, switches the first charge current to a second charge current lower than the first charge current and continues the constant-current charge. The conditions include the condition that the SOC of secondary battery arrives at a threshold SOC value and the condition that the inter-terminal voltage of secondary battery arrives at a threshold inter-terminal voltage. In response to the degree of degradation of secondary battery, the charge control unit drops at least one of the threshold SOC value and the threshold inter-terminal voltage.

5 Claims, 6 Drawing Sheets (51) Int. Cl.
  *H02J 7/00*  (2006.01)
  *H01M 10/44*  (2006.01)
  *H01M 10/0525*  (2010.01)
  *H01M 10/46*  (2006.01)

(52) U.S. Cl.
  CPC ........... *H01M 10/46* (2013.01); *H02J 7/0052* (2013.01); *H02J 7/0088* (2013.01)

(58) Field of Classification Search
  USPC .................... 320/152, 156–159, 161–165
  See application file for complete search history.

(56) References Cited

U.S. PATENT DOCUMENTS

2012/0112700 A1* 5/2012 Morimoto ............ H02J 7/0072
  320/132
2013/0314050 A1* 11/2013 Matsubara ................ H02J 7/00
  320/134

FOREIGN PATENT DOCUMENTS

| JP | 2006-252849 | 9/2006 |
| JP | 2008-228492 | 9/2008 |
| JP | 2011-015481 | 1/2011 |
| WO | 2011/004550 | 1/2011 |

* cited by examiner

SECONDARY-BATTERY CHARGING SYSTEM AND METHOD AND BATTERY PACK

This application is a U.S. national stage application of the PCT international application No. PCT/JP2014/001433.

TECHNICAL FIELD

The present invention relates to a charging technology of a lithium-ion secondary battery or the like.

BACKGROUND ART

A nonaqueous electrolyte secondary battery such as a lithium-ion secondary battery has a high energetic density and a characteristic allowing reduction in size and weight of an apparatus. Nonaqueous electrolyte secondary batteries are widely used for main power sources of various electronic apparatuses, power sources for industry or transportation installed in automobiles or airplanes, and main power sources or the like for domestic use.

Normally, in charging a nonaqueous electrolyte secondary battery, constant-current charge is performed, and then constant-voltage charge is performed to provide a full charge state. Increasing the charge current can reduce the charge duration, but increases the charge/discharge cycle degradation of the secondary battery to reduce the service life. While, decreasing the charge current can suppress the charge/discharge cycle degradation, but increases the charge duration. In other words, there is a trade-off relationship between the charge duration and charge/discharge cycle degradation with respect to the charge current.

Patent Literature 1 discloses the charging method of a nonaqueous electrolyte secondary battery in which constant-voltage charge is performed after constant-current charge. In this charging method, the rate of time variation in the voltage during the constant-current charge is calculated, and, when the rate of time variation changes from increase to decrease, the constant-current charge is switched to constant-voltage charge.

Patent Literature 2 discloses the charging method of a lithium-ion secondary battery in which the degradation level of the lithium-ion secondary battery is detected, and, when the degradation progresses, the set voltage is decreased and full charge is performed.

CITATION LIST

Patent Literature

PTL 1: Unexamined Japanese Patent Publication No. 2006-252849
PTL 2: Unexamined Japanese Patent Publication No. 2008-228492

SUMMARY OF THE INVENTION

The charge/discharge cycle degradation of a secondary battery can be suppressed by adjusting the switching timing from constant-current charge to constant-voltage charge or by adjusting the set voltage during full charge. However, reduction of the charge duration is not sufficiently investigated.

The purpose of the present invention is to provide a charging system and method and a battery pack that can reconcile the reduction of the charge duration with the suppression of the charge/discharge cycle degradation at a high level, and hence can reduce the charge duration while suppressing the charge/discharge cycle degradation.

The charging system of a secondary battery of the present invention includes the following components:
a secondary battery;
a charger for charging the secondary battery; and
a charge controlling unit for controlling the charger during charge of the secondary battery so that the charger performs constant-current charge at a first charge current, and, when at least one of the following conditions is satisfied, switches the first charge current to a second charge current lower than the first charge current and continues the constant-current charge.

Here, the conditions include the condition that the state of charge (SOC) of the secondary battery arrives at a threshold SOC value, and the condition that the inter-terminal voltage of the secondary battery arrives at a threshold inter-terminal voltage. In response to the degree of degradation of the secondary battery, the charge controlling unit drops at least one of the first charge current and the second charge current. The dropping the first charge current means changing the first charge current to a charge current lower than the first charge current. The dropping the second charge current is similar to the dropping the first charge current.

In one exemplary embodiment of the present invention, in response to the degree of degradation of the secondary battery, the charge controlling unit drops at least one of the threshold SOC value and the threshold inter-terminal voltage and switches the charge current from the first charge current to the second charge current. Dropping a value means changing the value to a smaller value. The dropping the threshold SOC value means changing the threshold SOC value to a SOC value smaller than it, and the dropping the threshold inter-terminal voltage means changing the threshold inter-terminal voltage to an inter-terminal voltage lower than it.

In another exemplary embodiment of the present invention, in response to the degree of degradation of the secondary battery, the charge controlling unit drops at least one of the threshold SOC value and threshold inter-terminal voltage, switches the charge current from the first charge current to the second charge current, and drops at least one of the first charge current and the second charge current.

In yet another exemplary embodiment of the present invention, the degree of degradation of the secondary battery is based on one of the charge/discharge cycle number of the secondary battery, the internal resistance value of the secondary battery, and the actual capacity of the secondary battery.

The battery pack of the present invention includes the following components:
a secondary battery; and
a charge controlling unit for outputting a control signal to a charger during charge of the secondary battery so that the charger performs constant-current charge at a first charge current value, and, when at least one of the following conditions is satisfied, switches the first charge current to a second charge current lower than the first charge current and continues the constant-current charge. Here, the conditions include the condition that the SOC of the secondary battery arrives at a threshold SOC value, and the condition that the inter-terminal voltage of the secondary battery arrives at a threshold inter-terminal voltage. In response to the degree of degradation of the secondary battery, the charge controlling unit outputs a control signal so as to drop at least one of the first charge current and the second charge current.

The charging method of a secondary battery of the present invention includes the following steps of:

performing constant-current charge of the secondary battery at a first charge current;

determining whether or not at least one of the following conditions is satisfied:

the SOC of the secondary battery arrives at a threshold SOC value; and the inter-terminal voltage of the secondary battery arrives at a threshold inter-terminal voltage;

when at least one condition is satisfied, switching the first charge current to a second charge current lower than the first charge current and continuing the constant-current charge; and dropping at least one of the threshold SOC value and the threshold inter-terminal voltage in response to the degree of degradation of the secondary battery.

In the present invention, the charge duration can be reduced while the charge/discharge cycle degradation of the secondary battery is suppressed.

DESCRIPTION OF EMBODIMENTS

First Exemplary Embodiment

Hereinafter, an exemplary embodiment of the present invention is described with reference to the accompanying drawings while a lithium-ion secondary battery is taken as an example of a nonaqueous electrolyte secondary battery. The present invention is not limited to this.

Figure 1:
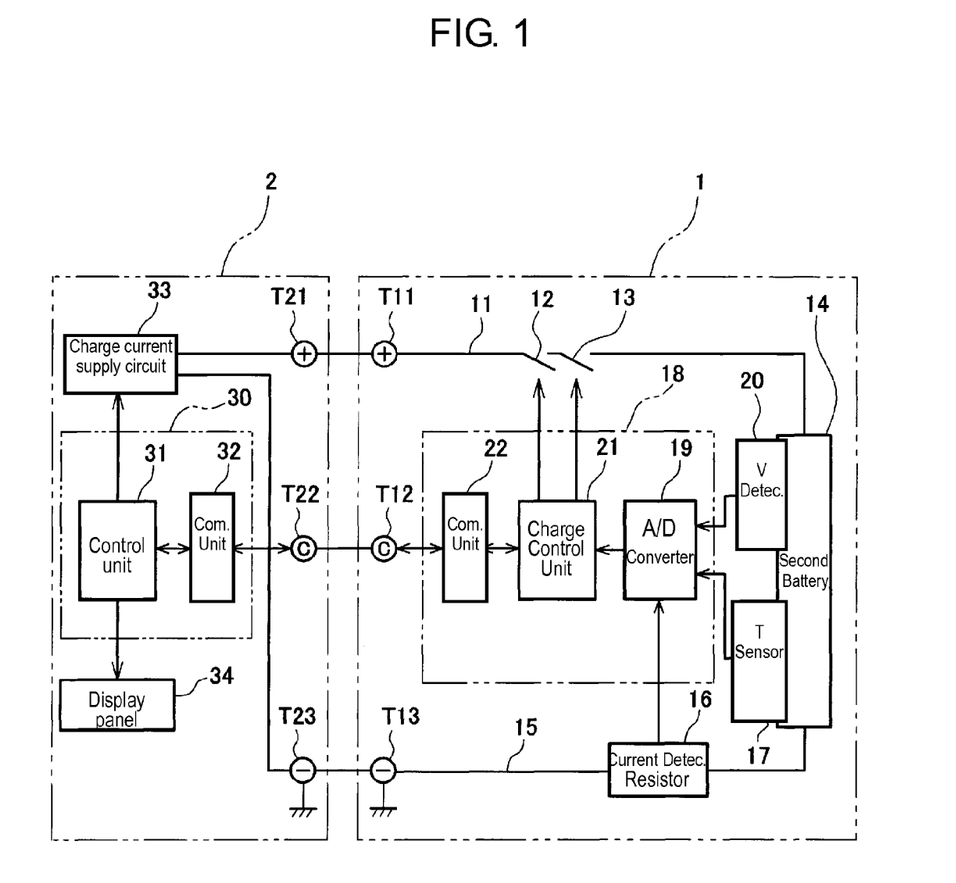
FIG. 1 is a system configuration diagram of an exemplary embodiment.

FIG. 1 shows a charging system configuration of the lithium-ion secondary battery of the present exemplary embodiment.

The charging system includes battery pack 1 and charger 2 electrically connected to battery pack 1. Positive-side terminal T11 and negative-side terminal T13 of battery pack 1 are connected to positive-side terminal T21 and negative-side terminal T23 of charger 2, respectively. Connector terminal T12 of battery pack 1 is connected to connector terminal T22 of charger 2.

<Battery Pack>

First, the configuration of battery pack 1 is described.

Battery pack 1 includes lithium-ion secondary battery 14 and control integrated circuit (IC) 18. Lithium-ion secondary battery 14 is formed by interconnecting a plurality of lithium-ion secondary battery cells in series and/or in parallel. Each cell includes a positive-electrode active material, a negative-electrode active material, and a separator. A lithium-containing composite oxide or the like is used as the positive-electrode active material, graphite or the like is used as the negative-electrode active material, and polypropylene and polyethylene are used as the separator.

Temperature sensor 17 is disposed at a predetermined position of lithium-ion secondary battery 14, and detects the temperature of each cell and supplies it to control IC 18.

Voltage detection sensor 20 is disposed at a predetermined position of lithium-ion secondary battery 14, and detects the inter-terminal voltage of each cell and supplies it to control IC 18.

Current detection resistor 16 is connected to the negative-side terminal of lithium-ion secondary battery 14, and detects the flowing current of lithium-ion secondary battery 14 and supplies it to control IC 18.

Control IC 18 includes A/D converter 19, charge control unit 21, and communication unit 22.

A/D converter 19 converts the current data of lithium-ion secondary battery 14, which has been detected by current detection resistor 16, into a digital value, and supplies the digital value to charge control unit 21. A/D converter 19 also converts the temperature data of lithium-ion secondary battery 14, which has been detected by temperature sensor 17, into a digital value, and supplies the digital value to charge control unit 21. A/D converter 19 also converts the voltage data of lithium-ion secondary battery 14, which has been detected by voltage detection sensor 20, into a digital value, and supplies the digital value to charge control unit 21.

On the basis of the current data, voltage data, and temperature data supplied from A/D converter 19, charge control unit 21 calculates the residual capacity of lithium-ion secondary battery 14 as a relative value with reference to the capacity during full charge. In other words, charge control unit 21 calculates the SOC (state of charge). The SOC is expressed in percentage (%) when the value during full charge is set at 100. The capacity during full charge can be defined as the initial capacity after the product shipment (or at the time of initial charge) of lithium-ion secondary battery 14. The capacity during full charge can be defined as the actual capacity (A*h) after the degradation due to its use.

Charge control unit 21 calculates the charge current value and charge voltage value on the basis of the calculated SOC. Charge control unit 21 supplies a control signal to charger 2 via communication unit 22. Furthermore, upon detecting an abnormality of the system on the basis of the data supplied from A/D converter 19 and the data received from charger 2, charge control unit 21 turns off switch elements 12 and 13 to protect lithium-ion secondary battery 14.

Charge control unit 21 is specifically formed of a microcomputer including a CPU (central processing unit) and a memory. The memory of the microcomputer includes a program memory and a working memory. The program memory stores a program for calculating the SOC of lithium-ion secondary battery 14 on the basis of the current data, voltage data, and temperature data, and the other operation programs. The calculation of the SOC can be performed using a publicly known method. The program memory also stores a threshold SOC value or threshold inter-terminal voltage value used for switching the charge current value. The working memory stores the data supplied from A/D converter 19 and the SOC value or the like obtained by calculation.

<Charger 2>

Next, the configuration of charger 2 is described.

Charger 2 includes control IC 30, charge current supply circuit 33, and display panel 34.

Control IC 30 includes control unit 31 and communication unit 32. Communication unit 32 receives a control signal supplied via communication unit 22 of battery pack 1, and supplies it to control unit 31. Control unit 31 controls charge current supply circuit 33 on the basis of the control signal received via communication unit 32. As necessary, control unit 31 displays the charge state of battery pack 1 on display panel 34. Charge current supply circuit 33 adjusts the increase/decrease of the charge current for charging battery pack 1 on the basis of a signal from control unit 31.

Generally, charger 2 charges battery pack 1 to the full charge by constant-current charge and constant-voltage charge. In the present exemplary embodiment, in the constant-current charge, a plurality of types of current are combined. In other words, two current values I1 and I2 (I1<I2 is assumed) are set as the plurality of types of current. The constant-current charge is performed at current I2 until lithium-ion secondary battery 14 arrives at a predetermined SOC value, and, when lithium-ion secondary battery 14 arrives at the predetermined SOC value, current I2 is switched to current I1 lower than current I2 and the constant-current charge is continued.

In other words, charge control unit 21 of battery pack 1 compares the calculated SOC value with the predetermined SOC value, and determines whether the SOC value of lithium-ion secondary battery 14 has arrived at the predetermined SOC value. When it has not arrived at the predetermined SOC value, charge control unit 21 supplies a control signal to control unit 31 of charger 2 so that the constant-current charge is performed at current I2. When it has arrived at the predetermined SOC value, charge control unit 21 supplies a control signal to control unit 31 of charger 2 so that the constant-current charge is performed at current I1 lower than current I2. On the basis of the control signal supplied from charge control unit 21, control unit 31 controls charge current supply circuit 33 so that the charge current is switched from I2 to I1. When charge current I2 is set as the first charge current and current I1 is set as the second charge current, the constant-current charge is performed so that the charge current is switched from the first charge current to the second charge current.

In the present exemplary embodiment, it is noted that the switch of the charge current from I2 to I1 is performed regardless of the degradation of lithium-ion secondary battery 14 even in the initial state having no degradation after the product shipment. In other words, in the present exemplary embodiment, the charge current is always and forcibly switched from I2 to I1 during the constant-current charge regardless of the degree or extent of the degradation of lithium-ion secondary battery 14. It is obvious that this constant-current charge is different from the conventional constant-current charge at a constant current. Instead of switching the charge current from I2 to I1 at the time of arrival at the predetermined SOC value, the charge current may be switched from I2 to I1 at the time when the inter-terminal voltage of lithium-ion secondary battery 14 arrives at a predetermined inter-terminal voltage.

The reason why charge is performed so that the charge current is switched is described below. When charge is performed at a constant current and when the charge current is high, the charge duration can be reduced, but the cycle degradation of lithium-ion secondary battery 14 progresses. While, when the charge current is low, the cycle degradation can be suppressed but the charge duration increases.

In the present exemplary embodiment, charge is performed so that the charge current is set at I2—relatively high—in the initial period, and, when lithium-ion secondary battery 14 arrives at the predetermined SOC value or the inter-terminal voltage corresponding to it, the charge current is switched to I1 relatively low. Thus, the charge duration is reduced by charge current I2, and the cycle degradation can be suppressed by charge current I1. As a result, the reduction of the charge duration and the suppression of the cycle degradation can be achieved simultaneously.

In the present exemplary embodiment, the charge current is switched from I2 to I1 during charge. However, whether to perform the constant-voltage charge after the constant-current charge can be set optionally. In other words, the following operation may be employed:

the charge during which the charge current is switched from I2 to I1 is performed to the full charge state; or after the charge during which the charge current is switched from I2 to I1 is performed, constant-voltage charge is performed.

The switching timing of the charge current from I2 to I1 can be obtained by acquiring data of the variation of the charge duration and the variation in the cycle degradation by changing the switching timing using a plurality of lithium-ion secondary batteries 14, and by selecting the switching timing that is the most effective in reducing the charge duration and suppressing the cycle degradation. The switching timing acquired in that manner (specifically, a threshold SOC value or threshold inter-terminal voltage value) is stored in a memory of charge control unit 21.

When lithium-ion secondary battery 14 degrades as the charge/discharge cycle progresses, the switching timing stored in the memory is not always appropriate. In this case, the switching timing is changed dynamically in response to the degree of degradation of lithium-ion secondary battery 14. Specifically, when lithium-ion secondary battery 14 significantly degrades, the degradation can be suppressed by decreasing the charge current. Therefore, it is desired that the switching timing is advanced in order to increase the relative duration of the constant-current charge at charge current I1.

<Detail of Charging Method>

Next, the charging method in the present exemplary embodiment is described in detail.

Figure 2:
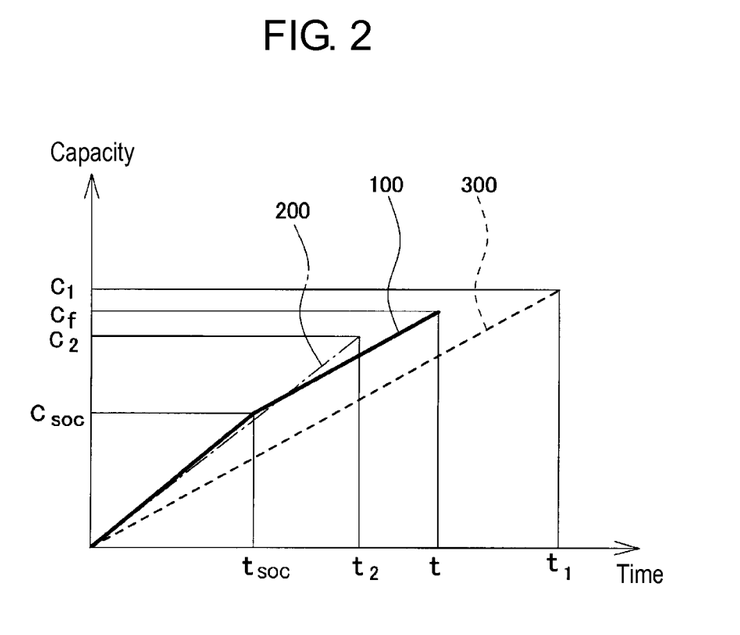
FIG. 2 is a diagram showing the variation in capacity of a secondary battery during charge.

FIG. 2 shows the time variation in charge capacity of lithium-ion secondary battery 14 during charge. In FIG. 2, the horizontal axis shows time, and the vertical axis shows charge capacity (A*h). For comparison, the solid line shows variation 100 in charge capacity by the charging method in the present exemplary embodiment, the dashed-dotted line shows variation 200 in charge capacity when charge is performed only by charge current I2, and the broken line shows variation 300 in charge capacity when charge is performed only by charge current I1. It is assumed that the charge is started at time t=0.

In the present exemplary embodiment, on the basis of the current data, voltage data, and temperature data supplied from A/D converter 19, charge control unit 21 sequentially calculates the residual capacity of lithium-ion secondary battery 14, namely SOC, at predetermined control timings. When it is determined that the charge of lithium-ion secondary battery 14 is required, charge control unit 21 supplies a charge command to control unit 31 of charger 2 via communication unit 22 and communication unit 32. The control command includes a command for setting the charge current at I2.

On the basis of the control signal supplied from charge control unit 21, control unit 31 of charger 2 controls the operation of charge current supply circuit 33, sets the charge current at I2, and supplies charge current I2 to battery pack 1. Lithium-ion secondary battery 14 of battery pack 1 is charged with charge current I2 supplied from charger 2, and the charge capacity gradually increases. Charge control unit 21 sequentially calculates the SOC of lithium-ion secondary battery 14 at predetermined control timings even during charge.

As the charge progresses, the charge capacity increases. When the charge capacity arrives at a predetermined capacity Csoc, and the SOC value of lithium-ion secondary battery 14 arrives at a predetermined SOC value—for example, SOC value=60% —charge control unit 21 supplies a switch command to control unit 31 of charger 2 via communication unit 22 and communication unit 32. This switch command includes a command for setting the charge current at I1. In FIG. 2, tsoc shows the timing when the charge capacity of lithium-ion secondary battery 14 arrives at Csoc and the SOC value arrives at the predetermined SOC value.

On the basis of the switch signal supplied from charge control unit 21, control unit 31 of charger 2 controls the operation of charge current supply circuit 33, switches the charge current from I2 to I1, and supplies charge current I1 to battery pack 1. Lithium-ion secondary battery 14 of battery pack 1 is charged with charge current I1 supplied from charger 2. By switching the charge current from I2 to I1, the rate of time variation in the charge capacity of lithium-ion secondary battery 14 is decreased correspondingly. In FIG. 2, the rate of time variation in the charge capacity, namely the gradient of variation 100 in the charge capacity, becomes gentle at time tsoc.

At the time when the charge at charge current I1 further progresses and the inter-terminal voltage arrives at a predetermined voltage Vf, arrival at the full charge state is determined and the charge is stopped. When the charge capacity arrives at capacity Cf (C2<Cf<C1) corresponding to inter-terminal voltage Vf, charge control unit 21 supplies a charge stop command to control unit 31 of charger 2 via communication unit 22 and communication unit 32. On the basis of the charge stop command supplied from charge control unit 21, control unit 31 of charger 2 controls the operation of charge current supply circuit 33, and sets the charge current at zero to stop the supply of the charge current to battery pack 1. In FIG. 2, t shows the timing when the charge capacity of lithium-ion secondary battery 14 arrives at Cf. Alternatively, when the charge capacity arrives at capacity Cf, charge control unit 21 may supply a constant-voltage charge command to control unit 31 of charger 2 via communication unit 22 and communication unit 32. On the basis of the constant-voltage charge signal supplied from charge control unit 21, control unit 31 of charger 2 controls the operation of charge current supply circuit 33, and supplies the charge current to battery pack 1 under a constant voltage condition.

While, when charge is performed only at charge current I2, charge progresses at a substantially constant gradient from the start of the charge as in variation 200 in charge capacity shown by the dashed-dotted line. When the charge capacity arrives at charge capacity C2 corresponding to inter-terminal voltage Vf, arrival at the full charge is determined and the charge is stopped. When the timing of arrival at charge capacity C2 is assumed to be t2, t2<t is satisfied.

When charge is performed only at charge current I1, charge progresses at a substantially constant gradient from the start of the charge as in variation 300 in charge capacity shown by the broken line. The gradient at this time is gentler than that when charge is performed at charge current I2. When the charge capacity arrives at charge capacity C1 corresponding to inter-terminal voltage Vf, arrival at the full charge is determined and the charge is stopped. When the timing of arrival at charge capacity C1 is assumed to be t1, t2<t<t1 is satisfied. Therefore, timing t of arrival at charge capacity Cf in the present exemplary embodiment exists between the timing when charge is performed only at charge current I2 and the timing when charge is performed only at charge current I1. The charge duration in the present exemplary embodiment is longer than that when charge is performed only at charge current I2, but can be made shorter than that when charge is performed only at charge current I1.

Figure 3:
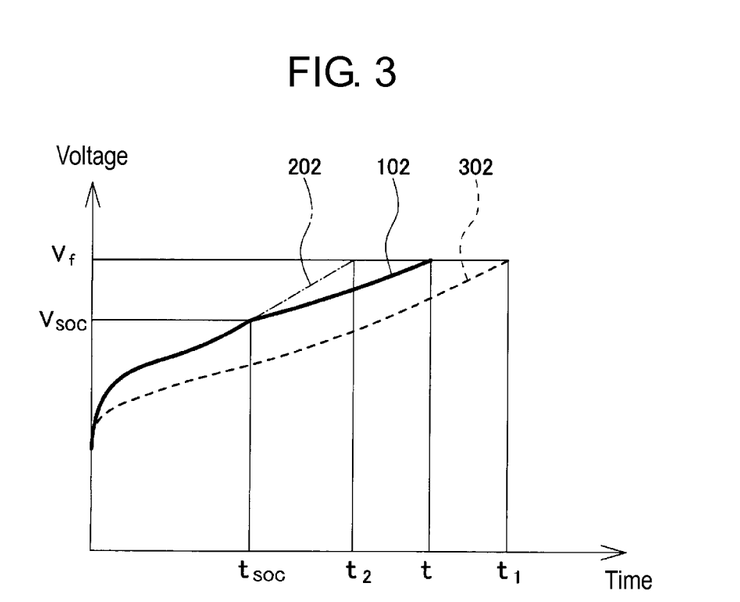
FIG. 3 is a diagram showing the variation in inter-terminal voltage of the secondary battery during charge.

FIG. 3 shows the time variation in the inter-terminal voltage of lithium-ion secondary battery 14 during charge. In FIG. 3, the horizontal axis shows time, and the vertical axis shows inter-terminal voltage (V). For comparison, the solid line shows variation 102 in inter-terminal voltage by the charging method in the present exemplary embodiment, the dashed-dotted line shows variation 202 in inter-terminal voltage when charge is performed only at charge current I2, and the broken line shows variation 302 in inter-terminal voltage when charge is performed only at charge current I1. It is assumed that the charge is started at time t=0.

In the present exemplary embodiment, first, lithium-ion secondary battery 14 is charged at charge current I2. When the charge progresses and the inter-terminal voltage of lithium-ion secondary battery 14 arrives at inter-terminal voltage Vsoc corresponding to the predetermined SOC value, charge control unit 21 supplies a switch command to control unit 31 of charger 2, and switches the charge current from I2 to I1. In FIG. 3, tsoc shows the timing when the inter-terminal voltage of lithium-ion secondary battery 14 arrives at Vsoc. This tsoc is the same as tsoc in FIG. 2. At this time, the charge current is switched from I2 to I1 and the gradient of the variation in inter-terminal voltage decreases. At the time when the charge further progresses and the inter-terminal voltage of lithium-ion secondary battery 14 arrives at inter-terminal voltage Vf, arrival at the full charge state is determined and the charge is stopped. The timing at this time is assumed to be t. This t is the same as t in FIG. 2.

While, when charge is performed only at charge current I2, variation 202 in inter-terminal voltage is substantially constant. When the timing at which the inter-terminal voltage of lithium-ion secondary battery 14 arrives at inter-terminal voltage Vf is assumed to be t2, this t2 is the same as t2 in FIG. 2 and t2<t is satisfied.

When charge is performed only at charge current I1, variation 302 in inter-terminal voltage is substantially constant. When the timing at which the inter-terminal voltage of lithium-ion secondary battery 14 arrives at inter-terminal voltage Vf is assumed to be t1, this t1 is the same as t1 in FIG. 2 and t2<t<t1 is satisfied.

Figure 4:
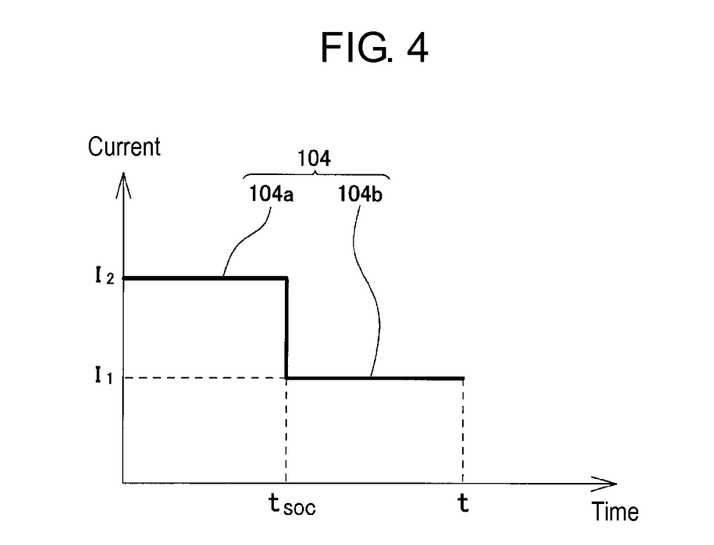
FIG. 4 is a diagram showing the switching between charge currents during charge.

FIG. 4 shows variation 104 in charge current in the present exemplary embodiment. It is assumed that charge is started at time t=0. First, the charge is started at charge current I2. Constant-current charge is performed at charge current I2 until the SOC value of lithium-ion secondary battery 14 arrives at the predetermined SOC value or until the inter-terminal voltage of lithium-ion secondary battery 14 arrives at inter-terminal voltage Vsoc corresponding to the predetermined SOC value.

When the charge progresses, and the SOC value of lithium-ion secondary battery 14 arrives at the predetermined SOC value or the inter-terminal voltage of lithium-ion secondary battery 14 arrives at inter-terminal voltage Vsoc corresponding to the predetermined SOC value, charge control unit 21 supplies a switch signal to control unit 31 of charger 2 and switches the charge current from I2 to I1. After that, constant-current charge is performed at charge current I1. When it is assumed that charge is started at time t=0, the charge current is switched at time tsoc, and the charge is stopped at time t, charge current I2 is used from time 0 to time tsoc and charge current I1 is used from time tsoc to time t. In FIG. 4, the charge at charge current I2 is denoted with symbol 104a, and the charge at charge current I1 is denoted with symbol 104b.

Figure 5:
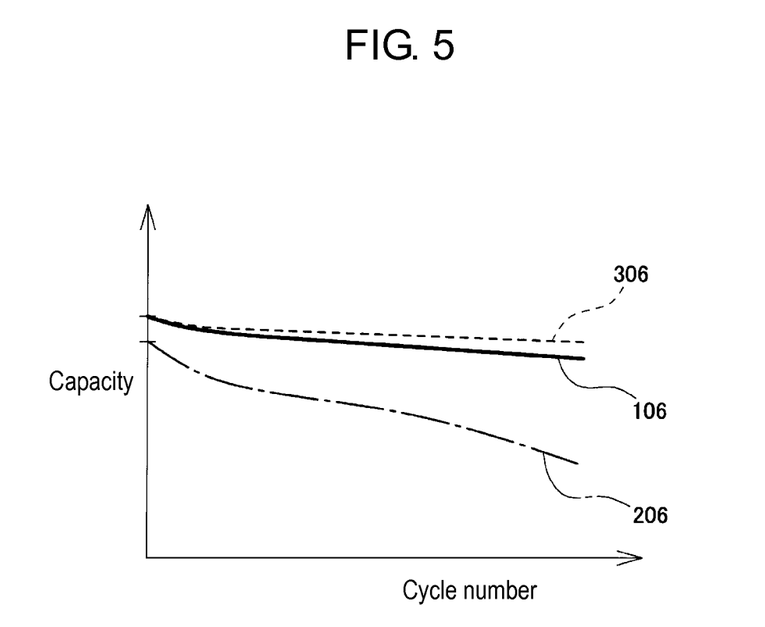
FIG. 5 is a diagram showing the relationship between the charge/discharge cycle number and the capacity.

FIG. 5 shows the relationship between the charge/discharge cycle number and the capacity. In FIG. 5, the horizontal axis shows charge/discharge cycle number, and the vertical axis shows actual capacity (A*h). For comparison, the solid line shows capacity variation 106 in the present exemplary embodiment, the dashed-dotted line shows capacity variation 206 when charge is performed only at charge current I2, and the broken line shows capacity variation 306 when charge is performed only at charge current I1. It is known that, as the charge/discharge cycle number increases, lithium-ion secondary battery 14 degrades and the actual capacity decreases. In other words, during the charge, the lithium in the positive-electrode active material of lithium-ion secondary battery 14 becomes lithium ions, and the lithium ions move into the clearance between the layers of the negative-electrode active material. At the stage immediately after the product shipment, lithium ions can enter the clearance between the layers of the negative-electrode active material to perform charge. As the charge/discharge cycle progresses, however, the crystal structure of the negative-electrode active material collapses and hence the lithium ions are difficult to enter the clearance between the layers. Therefore, the actual capacity decreases.

When charge is performed only at charge current I2, the charge duration is short as shown in FIG. 2 or FIG. 3. As shown by capacity variation 206, however, the degree of decrease in actual capacity with respect to the charge/discharge cycle number increases. While, when the charge current is switched from charge current I2 to charge current I1 during charge as shown in the present exemplary embodiment, the degree of decrease in actual capacity with respect to the charge/discharge cycle number is suppressed as shown by capacity variation 106, and can be suppressed to substantially the same extent as that when charge is performed only at charge current I1. In the present exemplary embodiment, the charge duration is t2<t<t1, and is shorter than that when charge is performed only at charge current I1. As a result, the charge duration is made shorter than that when charge is performed only at charge current I1, and simultaneously the cycle degradation can be suppressed to the same extent as that when charge is performed only at charge current I1.

<Adjustment of Switching Timing>

In the charging method of the present exemplary embodiment, even at the initial stage after the product shipment, the charge current is switched from I2 to I1 during the charge of lithium-ion secondary battery 14. The switching timing in this case may be always fixed regardless of the state of lithium-ion secondary battery 14, or the switching timing may be adjusted in response to the degree of degradation of lithium-ion secondary battery 14.

In other words, in the present exemplary embodiment, the cycle degradation can be suppressed by switching the charge current from I2 to I1 during the charge. However, the degradation of lithium-ion secondary battery 14 progresses as the charge/discharge cycle progresses.

When it is determined that the charge/discharge cycle progresses and the degradation of lithium-ion secondary battery 14 progresses to some extent, charge control unit 21 advances the timing of switching the charge current from I2 to I1. Specifically, the predetermined SOC value for determining the switching timing or inter-terminal voltage Vsoc corresponding to the predetermined SOC value is decreased to a lower value, and the SOC value after the decrease or the inter-terminal voltage corresponding to it is used to switch the charge current. For example, the SOC value is dropped from 60% at the initial stage to 55% or 50%. By dropping the predetermined SOC value, the timing when lithium-ion secondary battery 14 arrives at the predetermined SOC value or the inter-terminal voltage corresponding to it becomes early, and the timing of switching the charge current from I2 to I1 also becomes early.

Figure 6:
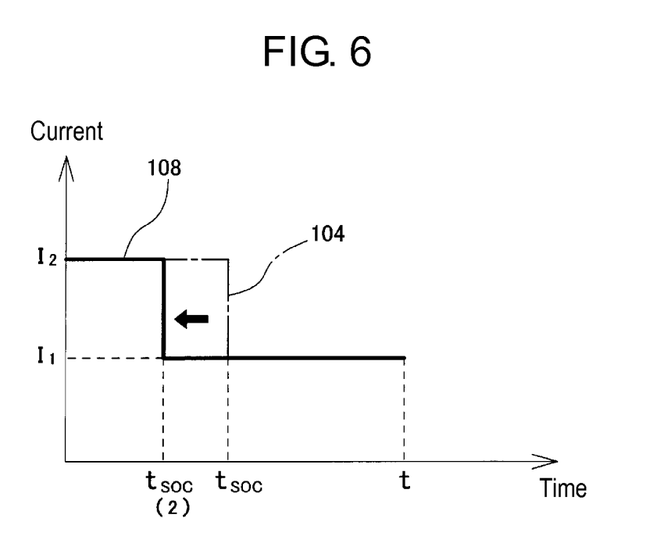
FIG. 6 is a diagram showing the adjustment of the switching timing.

FIG. 6 shows the variation in charge current at the time when the charge/discharge cycle number increases and arrives at a certain cycle number. In FIG. 6, for comparison, the solid line shows variation 108 in charge current at the time when the charge/discharge cycle number arrives at the certain cycle number, and the dashed-dotted line shows variation 104 in charge current at the initial stage after the product shipment. At the initial stage after the product shipment, namely until the charge/discharge cycle number arrives at the certain cycle number, charge is performed so that the charge current is switched from I2 to I1 at timing tsoc when the SOC value arrives at the predetermined SOC value. While, when it is determined that the charge/discharge cycle number arrives at the certain cycle number and the degradation of lithium-ion secondary battery 14 progresses, charge is performed so that the predetermined SOC value is dropped and the charge current is switched from I2 to I1 at timing tsoc (2) when the SOC value arrives at the dropped predetermined SOC value. Here, tsoc (2)<tsoc is satisfied. When lithium-ion secondary battery 14 degrades significantly, the switching timing is advanced correspondingly to the degradation. Thus, the relative duration of the charge at charge current I1 increases and the charge duration increases correspondingly, but the subsequent degradation of lithium-ion secondary battery 14 can be suppressed.

The cycle number at which the predetermined SOC value or the inter-terminal voltage corresponding to it is dropped can be set uniformly, or can be made to differ between lithium-ion secondary batteries 14. Alternatively, in response to the charge/discharge cycle number, the predetermined SOC value or the inter-terminal voltage corresponding to it may be sequentially dropped.

Figure 7:
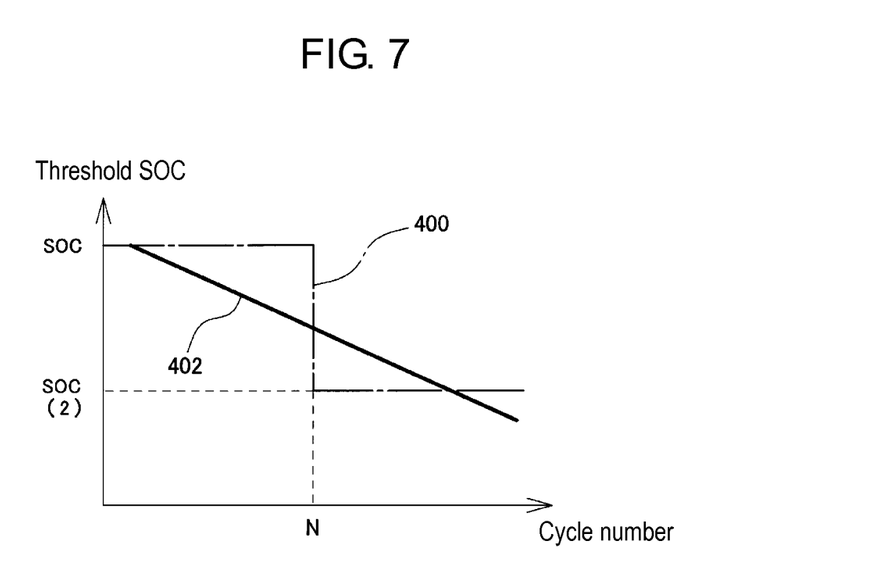
FIG. 7 is a diagram showing the relationship between the charge/discharge cycle number and the threshold SOC value.

FIG. 7 shows the relationship between the charge/discharge cycle number and the predetermined SOC value (threshold SOC value). The threshold SOC value may be replaced with the threshold inter-terminal voltage corresponding to it. Variation 400 in the threshold SOC value shows the case in which the threshold SOC value is dropped at a certain cycle number. The threshold SOC value until the charge/discharge cycle number arrives at certain value N is set at the predetermined SOC value. At the time when the charge/discharge cycle number arrives at certain value N, the threshold SOC value is dropped to subsequently used SOC (2). Here, SOC>SOC (2) is satisfied. Variation 402 in the threshold SOC value shows the case in which the threshold SOC value is continuously decreased as the cycle number increases.

Thus, in consideration that lithium-ion secondary battery 14 degrades as the charge/discharge cycle number increases, the threshold SOC value or the threshold inter-terminal voltage corresponding to it is dropped in response to the charge/discharge cycle number. Thus, the timing of switching the charge current from I2 to I1 can be advanced in response to the degree of degradation, and the subsequent degradation can be effectively suppressed.

Second Exemplary Embodiment

The above description shows the case where the timing of switching the charge/discharge current from I2 to I1 is adjusted in response to the charge/discharge cycle number. However, the charge current value may be dropped without changing the timing of switching the charge/discharge current from I2 to I1.

Figure 8:
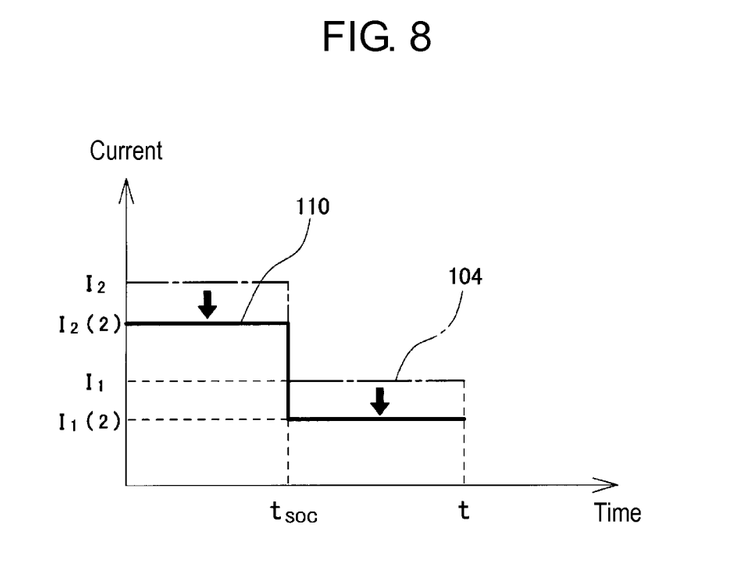
FIG. 8 is a diagram showing the adjustment of the charge current value.

FIG. 8 shows the variation in charge current at the time when the charge/discharge cycle number increases and arrives at a certain cycle number. In FIG. 8, for comparison, the solid line shows variation 110 in charge current at the time when the charge/discharge cycle number arrives at the certain cycle number, and the dashed-dotted line shows variation 104 in charge current at the initial stage after the product shipment. At the initial stage after the product shipment, namely until the charge/discharge cycle number arrives at the certain cycle number, charge is performed so that the charge current is switched from I2 to I1 at timing tsoc when the SOC value arrives at the predetermined SOC value. While, when it is determined that the charge/discharge cycle number arrives at the certain cycle number and the degradation of lithium-ion secondary battery 14 progresses, the predetermined SOC value is kept as it is, the charge current at the start of the charge is dropped from I2 to I2 (2), and the charge current is dropped from I1 to I1 (2) at the time of arrival at the predetermined SOC value. Here, I1>I1 (2) and I2>I2 (2) are satisfied.

By dropping the charge current from I2 to I2 (2) and then dropping the charge current from I1 to I1 (2), the charge duration increases correspondingly, but the cycle degradation of lithium-ion secondary battery 14 can be suppressed.

In FIG. 8, both of charge current I2 and charge current I1 are dropped as the charge/discharge cycle number increases. However, only charge current I1 may be dropped while charge current I2 is kept as it is.

Third Exemplary Embodiment

In the first exemplary embodiment, the switching timing is advanced in response to the degree of degradation of lithium-ion secondary battery 14, namely in response to the charge/discharge cycle number. In the second exemplary embodiment, the charge current value is dropped in response to the charge/discharge cycle number. These methods may be combined. In other words, the switching timing may be advanced and the charge current value may be dropped in response to the degree of degradation of lithium-ion secondary battery 14, namely in response to the charge/discharge cycle number.

Figure 9:
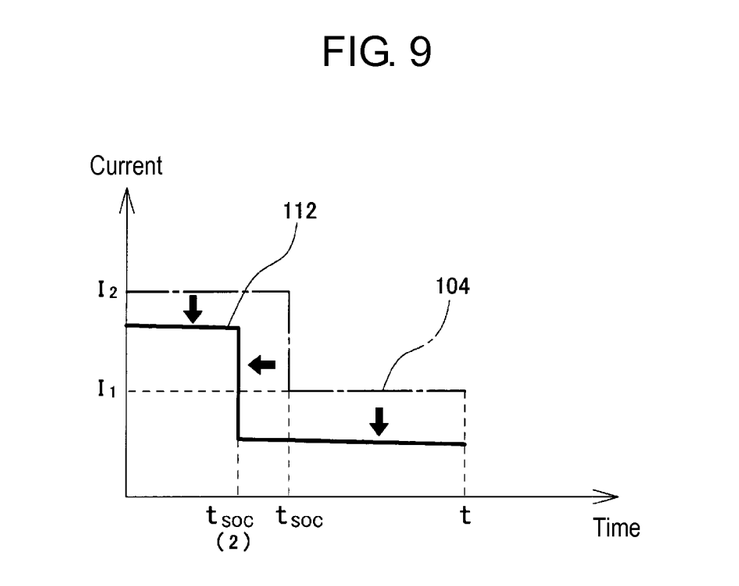
FIG. 9 is a diagram showing the adjustment of the switching timing and the charge current value.

FIG. 9 shows the variation in charge current at the time when the charge/discharge cycle number increases and arrives at a certain cycle number. In FIG. 9, for comparison, the solid line shows variation 112 in charge current at the time when the charge/discharge cycle number arrives at the certain cycle number, and the dashed-dotted line shows variation 104 in charge current at the initial stage after the product shipment. At the initial stage after the product shipment, namely until the charge/discharge cycle number arrives at the certain cycle number, charge is performed so that the charge current is switched from I2 to I1 at timing tsoc when the SOC value arrives at the predetermined SOC value. While, when it is determined that the charge/discharge cycle number arrives at the certain cycle number and the degradation of lithium-ion secondary battery 14 progresses, the predetermined SOC value is dropped to SOC (2), the charge current at the start of the charge is dropped from I2 to I2 (2), and the charge current is dropped from I1 to I1 (2) at the time of arrival at SOC (2).

By advancing the switching timing of the charge current and by dropping both the charge current values before and after the switching to I2 (2) and I1 (2), the charge duration increases correspondingly, but the cycle degradation of lithium-ion secondary battery 14 can be effectively suppressed.

In the present exemplary embodiment, instead of the method where the predetermined SOC value for defining the timing of switching the charge current is dropped stepwise at the time of arrival at a certain cycle number, the predetermined SOC value may be continuously decreased as the charge/discharge cycle number increases as shown in FIG. 7.

Figure 10:
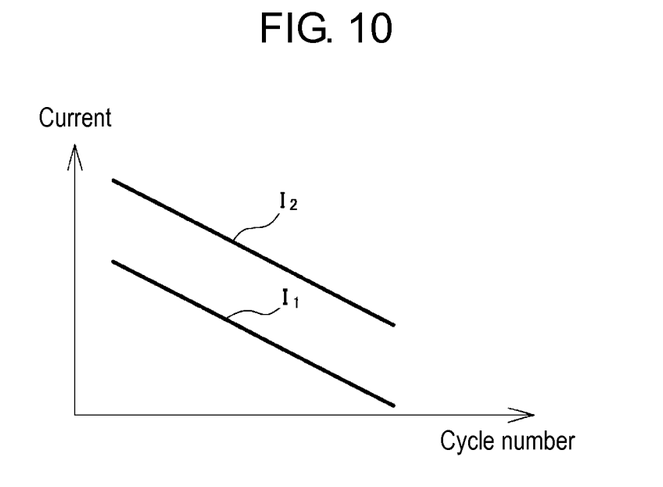
FIG. 10 is a diagram showing the relationship between the charge/discharge cycle number and the charge current value.

Also regarding the charge current, instead of the method where the charge current is dropped stepwise at the time of arrival at the certain cycle number, the charge current may be continuously decreased as the charge/discharge cycle number increases as shown in FIG. 10. In FIG. 10, the horizontal axis shows charge/discharge cycle number, and the vertical axis shows charge current. Both charge currents I2 and I1 continuously decrease as the charge/discharge cycle number increases. In FIG. 10, the degrees of decrease in charge currents I2 and I1, namely gradients, are substantially the same. However, the present invention is not limited to this. For example, the degree of decrease in charge current I2 is made higher than that of charge current I1, or, conversely, the degree of decrease in charge current I2 is made lower than that in charge current I1.

In the present exemplary embodiment, the adjustment of the switching timing and the adjustment of the charge current value can be combined variously. Specifically, the various combinations can be described below.

(1) The threshold SOC value or the threshold inter-terminal voltage is dropped, and charge current I2 is dropped.

(2) The threshold SOC value or the threshold inter-terminal voltage is dropped, and charge current I1 is dropped.

(3) The threshold SOC value or the threshold inter-terminal voltage is dropped, and both charge currents I2 and I1 are dropped.

(4) The threshold SOC value or the threshold inter-terminal voltage is dropped when lithium-ion secondary battery 14 degrades to some extent, and, when the lithium-ion secondary battery further degrades, charge currents I2 and I1 are dropped.

In (4) mentioned above, it is noted that the dropping of the threshold SOC value or the threshold inter-terminal voltage and the dropping of the charge current are not performed simultaneously, but are performed at different timings.

Another Exemplary Embodiment

Thus, the exemplary embodiments of the present invention have been described, but the present invention is not limited to these and can be varied. All the modified examples of them are included in the present invention.

For example, the present exemplary embodiment, the switching timing of the charge current is defined by the SOC value or the inter-terminal voltage corresponding to it. When the switching timing is defined by the inter-terminal voltage, the following method may be employed: the inter-terminal voltage in the full charge state is set at 4.1 V to 4.2 V; and, when the inter-terminal voltage of lithium-ion secondary battery 14 arrives at about 3.9 V, the charge current is switched from I2 to I1.

The charge current may be switched from I2 to I1 using both of the SOC value and inter-terminal voltage instead of using any one of the SOC value and inter-terminal voltage. For example, when the SOC value arrives at 60% and the inter-terminal voltage arrives at 3.9 V, the charge current is switched from I2 to I1. In other words, charge control unit 21 of battery pack 1 detects the SOC and inter-terminal voltage of lithium-ion secondary battery 14. And, when at least one of the condition that the SOC becomes a predetermined SOC value and the condition that the inter-terminal voltage becomes a predetermined inter-terminal voltage is satisfied, charge control unit 21 supplies, to charger 2, a control signal for switching the charge current from I2 to I1.

In the present exemplary embodiment, the charge current is switched from I2 to I1, namely between two stages. The charge current may be switched between three stages or more. For example, the charge current is switched from I2 to I1 when the SOC value of lithium-ion secondary battery 14 arrives at a predetermined first SOC value, and the charge current is switched from I1 to I0 when the SOC value arrives at a predetermined second SOC value. Here, first SOC value<second SOC value and I0<I1<I2 are satisfied.

In the present exemplary embodiment, the charge/discharge cycle number is used as one indicator for evaluating the degree of degradation of lithium-ion secondary battery 14. However, another parameter for evaluating the degree of degradation may be used. For example, a state of health (SOH) is known as a parameter for showing the degree of degradation. However, regardless of the name, a parameter for showing the degree of variation in actual capacity can be used. Parameters for showing the degree of degradation of lithium-ion secondary battery 14 are listed below:
(1) internal resistance of lithium-ion secondary battery 14;
(2) actual capacity of lithium-ion secondary battery 14; and
(3) charge/discharge cycle number of lithium-ion secondary battery 14.
In the present exemplary embodiment, whether to perform the constant-voltage charge is determined optionally, but the case where the constant-voltage charge is performed is described below.

In other words, when constant-voltage charge of lithium-ion secondary battery 14 is performed after constant-current charge thereof is performed, the charging method of the present exemplary embodiment is applied to the constant-current charge. For example, the constant-current charge is performed at charge current I2 until arrival at a predetermined SOC value or an inter-terminal voltage corresponding to it. At the time of arrival at the predetermined SOC value or the inter-terminal voltage corresponding to it, charge current I2 is switched to charge current I1 and the constant-current charge is continued. Then, at the time of arrival at a set voltage, the constant-current charge including the switching between the two currents is stopped, and constant-voltage charge is started. When the charge current becomes a predetermined value or less, lithium-ion secondary battery 14 is determined to arrive at the full charge state, the constant-voltage charge is stopped.

The invention claimed is:

1. A charging system of a secondary battery comprising:
a secondary battery;
a charger for charging the secondary battery; and
charge controlling unit configured to control the charger during charge of the secondary battery so that the charger:
  performs constant-current charge at a first charge current,
  switches the first charge current to a second charge current lower than the first charge current, when at least one of the following conditions (i) and (ii) is satisfied:
    (i) an SOC of the secondary battery arrives at a threshold SOC value; and
    (ii) an inter-terminal voltage of the secondary battery arrives at a threshold inter-terminal voltage, and
  continues the constant-current charge with the second charge current until a predetermined SOC higher than the threshold SOC or a predetermined inter-terminal voltage higher than the threshold inter-terminal voltage,
wherein the charge controlling unit determines a degree of degradation based on at least one of a charge/discharge cycle number of the secondary battery, an internal resistance value of the secondary battery, and an actual capacity of the secondary battery, and decreases at least one of the first charge current and the second charge current based on the degree of degradation.

2. The charging system of the secondary battery according to claim 1, wherein
at the switching timing, the charge controlling unit decreases at least one of the threshold SOC value and the threshold inter-terminal voltage and switches the first charge current to the second charge current.

3. A battery pack comprising:
a secondary battery; and
charge controlling unit configured to output a control signal to a charger during charge of the secondary battery so that the charger:
  performs constant-current charge at a first charge current,
  switches the first charge current to a second charge current lower than the first charge current, when at least one of the following conditions (i) and (ii) is satisfied:
    (i) an SOC of the secondary battery arrives at a threshold SOC value; and
    (ii) an inter-terminal voltage of the secondary battery arrives at a threshold inter-terminal voltage, and
  continues the constant-current charge with the second charge current until a predetermined SOC higher than the threshold SOC or a predetermined inter-terminal voltage higher than the threshold inter-terminal voltage,
wherein the charge controlling unit determines a degree of degradation based on at least one of a charge/discharge cycle number of the secondary battery, an internal resistance value of the secondary battery, and an actual capacity of the secondary battery, and decreases at least one of the first charge current and the second charge current based on the degree of degradation.

4. The battery pack according to claim 3, wherein
at the switching timing, the charge controlling unit outputs the control signal so as to decrease at least one of the threshold SOC value and the threshold inter-terminal voltage and switch the first charge current to the second charge current.

5. A charging method of a secondary battery comprising:

performing constant-current charge of the secondary battery at a first charge current;

determining whether or not at least one of the following conditions (i) and (ii) is satisfied:
 (i) an SOC of the secondary battery arrives at a threshold SOC value; and
 (ii) an inter-terminal voltage of the secondary battery arrives at a threshold inter-terminal voltage;

when at least one of the conditions (i) and (ii) is satisfied, switching the first charge current to a second charge current lower than the first charge current and continuing the constant-current charge;

continuing the constant-current charge with the second charge current until a predetermined SOC higher than the threshold SOC or a predetermined inter-terminal voltage higher than the threshold inter-terminal voltage;

determining a degree of degradation based on at least one of a charge/discharge cycle number of the secondary battery, an internal resistance value of the secondary battery, and an actual capacity of the secondary battery; and decreasing at least one of the threshold SOC value and the threshold inter-terminal voltage.

* * * * *